United States Patent
Barklage-Hilgefort et al.

(10) Patent No.: US 6,622,524 B1
(45) Date of Patent: Sep. 23, 2003

(54) GLASS WHICH ABSORBS ULTRAVIOLET LIGHT, METHOD FOR PRODUCING SAID GLASS AND USE OF THE SAME

(75) Inventors: Hans-Jürgen Barklage-Hilgefort, Nienburg (DE); Wolfgang Cieleback, Nienburg (DE)

(73) Assignee: Nienburger Glas GmbH, Nienburg (DE)

(*) Notice: Subject to any disclaimer, the term of this patent is extended or adjusted under 35 U.S.C. 154(b) by 57 days.

(21) Appl. No.: 09/868,286

(22) PCT Filed: Dec. 3, 1999

(86) PCT No.: PCT/EP99/09482
§ 371 (c)(1),
(2), (4) Date: Jul. 20, 2001

(87) PCT Pub. No.: WO00/35819
PCT Pub. Date: Jun. 22, 2000

(30) Foreign Application Priority Data

Dec. 16, 1998 (DE) .......................................... 198 58 156
Feb. 9, 1999 (DE) .......................................... 199 05 108

(51) Int. Cl.⁷ .............................................. C03B 5/16
(52) U.S. Cl. .................. 65/134.3; 65/135.9; 65/136.2; 501/63; 501/905
(58) Field of Search .................. 65/134.3, 135.9, 65/136.2; 501/63, 905

(56) References Cited

U.S. PATENT DOCUMENTS 3,647,489 A * 3/1972 McMillan et al.
4,004,903 A * 1/1977 Daman et al.

FOREIGN PATENT DOCUMENTS

| DE | 41 11 702 C1 | 10/1992 |
| DE | 44 10 968 A1 | 10/1995 |
| DE | 195 05 617 A1 | 10/1995 |
| DE | 694 02 510 T2 | 7/1997 |
| EP | 0 799 805 A1 | 10/1997 |
| GB | 2 325 927 A | 12/1998 |

OTHER PUBLICATIONS

Patent Abstracts of Japan, vol. 16, No. 566 (Dec. 8, 1992).
Patent Abstracts of Japan, vol. 8, No. 138 (Jun. 27, 1984).
Patent Abstracts of Japan, vol. 7, No. 3 (Jan. 7, 1983).
Patent Abstracts of Japan, 02–048427 (Feb. 19, 1990).
Patent Abstracts of Japan, 06–072738 (Mar. 15, 1994).

* cited by examiner

*Primary Examiner*—Michael Colaianni
(74) *Attorney, Agent, or Firm*—Technoprop Colton LLC

(57) ABSTRACT

Foodstuffs filled in glass containers undergo a change in taste under the influence of light. In order to combat such changes in taste the glass according to the invention contains vanadium pentoxide. Since pure vanadium pentoxide is relative expensive, the invention proposes a way of using a mixture of vanadium pentoxide and phosphorous oxide which is available as an economical aggregate. This type of glass is preferably used to accomodate foodstuffs. The glass containing vanadium pentoxide and phosphorous oxide is particularly suited for bottles to hold beer. Such bottles exhibit particularly effective light protection properties when they are made of so-called white glass.

18 Claims, 1 Drawing Sheet

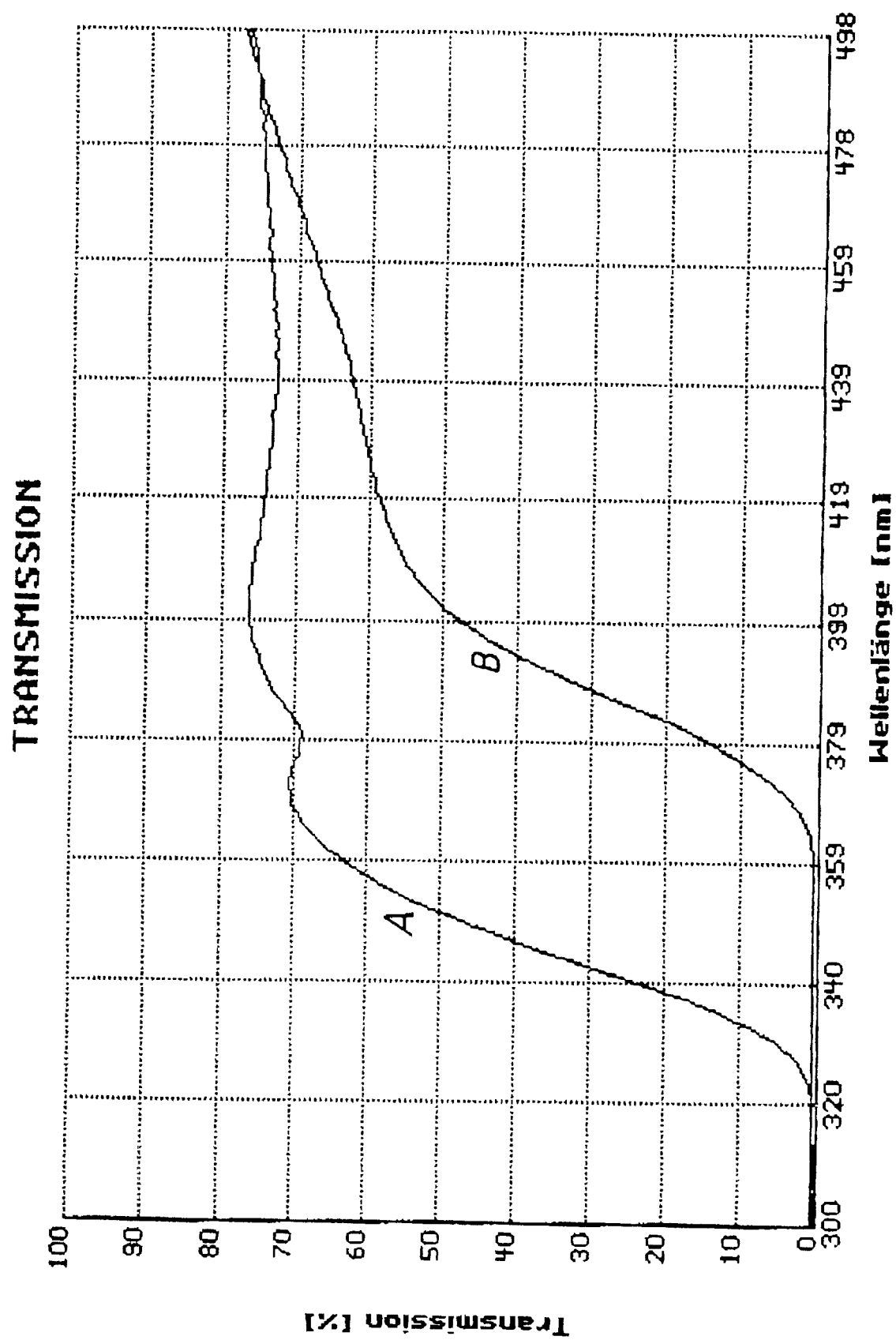

GLASS WHICH ABSORBS ULTRAVIOLET LIGHT, METHOD FOR PRODUCING SAID GLASS AND USE OF THE SAME

BACKGROUND OF THE INVENTION

1. Technical Field

The invention relates to glass having light protection properties, a method for manufacturing such glass and preferred applications of same.

2. Prior Art

Common glass offers only insufficient protection from the effects of light. In particular it lacks the sufficient capacity to absorb ultraviolet light. There is increasing demand for glass offering protection from the action of light, especially that of ultraviolet light. This applies all to clear or only slightly tinted glass used in the packaging of various foodstuffs, especially beverages such as beer, for example.

There are a number of known possibilities for creating glass which ensures protection from light action, in particular through the absorption of ultraviolet rays. In these types of glass the desired light protection properties are achieved by relatively costly methods. These kinds of known glasses capable of absorbing ultraviolet light are thus relatively expensive.

BRIEF SUMMARY OF THE INVENTION

The invention is based on the objective of creating a cost-efficient glass with light protection properties, a simple method for manufacturing such glass and advantageous application of same.

A glass capable of absorbing in particular ultraviolet light for the purpose of solving the stated objective is characterized by a vanadium-containing aggregate. The addition of vanadium imparts UV-ray absorbing properties to the glass, thus making it light-protected. Through the use of an aggregate containing vanadium there is no need to use pure vanadium (vanadium oxide) but merely an economical aggregate containing vanadium oxide as one component among other components. Such and "impure" aggregate is much more economical that pure vanadium oxide.

The aggregate is preferably a residual product containing vanadium oxide as the vanadium donor component. Such residual products arise during other manufacturing processes and can therefore be produced relatively economically.

A glass suitable for achieving the objective stated at the outset comprises the composition disclosed herein. Accordingly, vanadium pentoxide and phosphorous oxide are used for light protection, with vanadium pentoxide imparting to the glass the UV-ray absorbing properties, while phosphorous oxide is employed as a companion substance as a reasonable alternative to the use of the more expensive pure vanadium pentoxide. Here it has been shown that phosphorous oxide had not negative effects on the glass composition and in particular does not reduce the light-protecting properties of the glass. Preferably, the percentage of vanadium pentoxide and phosphorous oxide used is about the same.

Also provided by the invention is that the visual color impression of the transparent or translucent glass is kept as low as possible. It has been demonstrated that for this type of (transparent and colorless) glass, it is only with the addition of vanadium pentoxide that the light protection effect is possible of significantly effective in the first place.

A method for solving the objective stated at the outset is characterized in that a vanadium-containing aggregate is added to a batch of raw materials. Accordingly, during the production of the UV-ray absorbent glass a vanadium-containing aggregate is added to the raw materials. Through the use of the vanadium-containing aggregate, which is merely added to the raw starting materials, the glass according to the invention is especially economical and simple to produce. This is particularly true if, according to a further suggestion of the invention, a residual product is used as the vanadium-containing aggregate.

The residual product used as the aggregate requires a vanadium pentoxide content of only 40–60% by weight, in particular up to approximately 50% by weight, in order to achieve the desired light protection of the glass. Therefore a relatively impure residual product or aggregate can be used.

Preferred applications for solving the objective stated at the outset include containers for foodstuffs; a transparent glass or a transparent bottle for foodstuffs, in particular for beverages; and a transparent bottle, in particular a colorless or essentially colorless transparent bottle, preferably a beer bottle. Accordingly, a glass as disclosed herein is particularly suited for making containers for foodstuffs. These may be jars or bottles.

A further preferred application of the glass as disclosed herein relates to a glass or a bottle for foodstuffs.

One particularly advantageous application for the glass as disclosed herein is directed towards a bottle for beverages, in particular for beer. The glass as disclosed herein can be preferably used for a colorless or neutral-colored transparent bottle for beer, specifically for beer containing alcohol as well as for alcohol-free beer, or other beverages.

BRIEF SUMMARY OF THE FIGURE

The FIGURE shows a view of the transmission spectrum of light protection glass according to the present invention in comparison to a conventional standard glass.

DETAILED DESCRIPTION OF THE PREFERRED EMBODIMENTS

Specified in the following is a preferred exemplary embodiment of a light-protective glass. It features the following composition:

| | |
|---|---|
| $SiO_2$ | 68.0–74.0% by weight |
| $Al_2O_3$ | 0.5–3.0% by weight |
| CaO | 8.0–12.0% by weight |
| MgO | 1.5–5.0% by weight |
| $Na_2O$ | 10.0–14.0% by weight |
| $K_2O$ | 0.0–2.0% by weight |
| $Fe_2O_3$ | 0.0–0.2% by weight |
| $SO_3$ | 0.01–0.3% by weight |
| $P_2O_5$ | 0.03–0.3% by weight |
| $V_2O_5$ | 0.03–0.3% by weight |

The above components are present in the glass according to the invention in such a proportion so that their sum, if necessary in combination with additional components, in particular elemental oxides and/or colorants whose percentage lies under is the practical detection limit, results in 100% by weight.

The percentage of vanadium pentoxide ($V_2O_5$) and phosphorous oxide ($P_2O_5$) are equal and lie within the stated range of 0.03 to 0.3% by weight, so that preferably a certain proportion of vanadium pentoxide is always matched by the similar percentage of phosphorous oxide. The percentage of vanadium pentoxide is preferably somewhat greater than the percentage of phosphorous oxide, specifically about 10% greater.

The glass composed from said components is completely or at least to a large degree colorless and transparent or translucent.

One example light protection glass is shown by the following composition:

| | |
|---|---|
| $SiO_2$ | 71.2% by weight |
| $Al_2O_3$ | 1.2% by weight |
| CaO | 10.3% by weight |
| MgO | 3.4% by weight |
| $Na_2O$ | 12.7% by weight |
| $K_2O$ | 0.45% by weight |
| $Fe_2O_3$ | 0.08% by weight |
| $SO_3$ | 0.12% by weight |
| $P_2O_5$ | 0.17% by weight |
| $V_2O_5$ | 0.2% by weight |

The vanadium pentoxide and phosphorous oxide are derived from a residual product containing both substances. The actual vanadium pentoxide required for the light-insensitive glass according to the invention is present in the residual product in impure form and is namely accompanied by phosphorous oxide. The residual product used for the example specified above for a light-protective glass has, for example, the following composition:

| | |
|---|---|
| $V_2O_5$ | 49.05% by weight |
| $P_2O_5$ | 44.44% by weight |
| $ZrO_2$ | 1.06% by weight |
| $SiO_2$ | 0.6% by weight |
| $Cr_2O_3$ | 0.6% by weight |
| $Fe_2O_3$ | 0.27% by weight |
| CaO | 0.1% by weight |

In addition, the residual product may contain remainders, in particular elemental oxides and/or colorants, whose individual amounts lie below the practical detection limit.

The light protection glass according to the above example has the following calorimetric measures:
Helmholz
 dom (nm)=553.97
 S=0.0633
Cielab
 L=89.875
 a=−9.581
 b=7.8816

The stated values were determined using measurements conducted according to DIN 6174 and DIN 5033 against air on a ground and polished sample at 2% standard calorimetric system, standard illuminant C and a wall thickness of 7.5 mm.

The included diagram shows a view of the transmission spectrum of the light protection glass according to the previous example (curve B) in comparison to a conventional standard glass (curve A) with the following calorimetric measures:
Helmholz
 dom (nm)=569.93
 S=0.0393
Cielab
 L=91.344
 a=−1.921
 b=4.2174

The observed values were measured analogously to the colorimetric measures of the light protection glass according to the example given.

A comparison of the diagrams transmission curves illustrates that in the range of ultraviolet light with a wave length between 320 to 400 nm (UV-A) the light transmission value for the light protection glass according to the embodiment of the invention is significantly less that of standard white glass.

During production of the glass according to the invention, an initial batch comprising the usual components of non-UV-absorbent glass without vanadium pentoxide and phosphorous oxide is formed in the first step. The vanadium-containing aggregate is then added to this raw batch. According to the invention, this aggregate is a residual product of vanadium pentoxide and phosphorous oxide. If necessary, the residual product may also contain traces, or small amounts, of other components. The residual product can be a waste product from an industrial process. This residual products serves as the vanadium carrier medium for the glass which, according to the invention, can absorb ultraviolet rays and provide light protection. The residual product is mixed into the other raw batch materials in a dry state. This can be done by mixing the dry raw batch materials with the dry aggregate, namely the residual product. But it is also conceivable that the raw batch materials are first melted, with the dry residual product then being added to the liquefied raw batch and mixed with it. In addition to other components, particularly those listed above, the resulting material so obtained for the glass according to the invention has in each case the same percentage of vanadium pentoxide and phosphorous oxide.

The glass featuring the composition set forth at the beginning is used to manufacture containers with light protection properties, in particular bottles or jars for foodstuffs. The glass serves preferably in the manufacture of transparent bottles for beverages.

The glass comprised of the composition listed at the outset is particularly suitable for manufacturing bottles for beer, wine, sparkling wines and other light-sensitive beverages.

It has been shown that in beer in particular, but also other types of beverages, the UV-ray-absorbent properties of the glass according to the invention prevent the occurrence of any alterations in taste caused by the action of light rays, in particular UV rays. This is particularly the case when colorless glass, so-called white glass, or even slightly tinted white glass is employed.

What is claimed is:

1. Ultraviolet-light absorbing glass having light protection properties, comprising a vanadium-containing aggregate, wherein the vanadium-containing aggregate is a residual product that has a vanadium-containing constituent.

2. Glass according to claim 1, wherein the aggregate is contains up to 50% by weight of vanadium pentoxide.

3. Glass according to claim 1, wherein the aggregate consists essentially of vanadium pentoxide and phosphorous oxide, in approximately equal parts.

4. Ultraviolet-light absorbing glass having light protection properties, comprising 68.0 to 74% by weight $SiO_2$, 0.5 to 3.0% by weight $Al_2O_2$, 8.0 to 12% by weight CaO, 1.5 to 5.0% by weight MgO, 10.0 to 14.0% by weight $Na_2O$, 0.01 to 0.3% by weight $K_2O$, 0.0 to 0.2% by weight $Fe_2O_3$, 0.01 to 0.3% by weight $SO_3$, 0.03 to 0.3% by weight $P_2O_5$ and 0.03 to 0.3% by weight $V_2O_5$, with the sum of all named constituents yielding 100% by weight.

5. Glass according to claim 4, wherein $P_2O_5$ and $V_2O_5$ are present in approximately equal amounts.

6. Glass according to claim 4, wherein the glass is colorless and transparent.

7. Method for manufacturing ultraviolet-light absorbing glass exhibiting light protection properties, from a batch of raw materials to which a vanadium-containing aggregate is added, wherein a residual product containing vanadium pentoxide is used as the vanadium-containing aggregate.

8. Method according to claim 7, wherein the residual product contains approximately 50% vanadium pentoxide.

9. Method according to claim 8, wherein the batch of raw materials is already melted and the residual product is mixed in, in solid form, to the already melted batch of raw materials with the remaining components of the glass.

10. Glass according to claim 1, wherein the glass is used for beverages.

11. Glass according to claim 4, wherein the glass is used for beverages.

12. Method according to claim 7, wherein the glass is used for beverages.

13. Glass according to claim 10, wherein the glass is transparent and colorless or essentially colorless and is used as a beer bottle.

14. Glass according to claim 6, wherein the glass is used as a beer bottle.

15. Glass according to claim 13, wherein the glass is transparent and colorless or essentially colorless and is used as a beer bottle.

16. Ultraviolet-light absorbing glass having light protection properties, comprising a vanadium-containing aggregate, wherein the vanadium-containing aggregate is a residual product containing up to 50% by weight of vanadium pentoxide and approximately equals parts of vanadium pentoxide and phosphorous oxide.

17. Ultraviolet-light absorbing glass having light protection properties, comprising 68.0 to 74% by weight $SiO_2$, 0.5 to 3.0% by weight $Al_2O_2$, 8.0 to 12% by weight CaO, 1.5 to 5.0% by weight MgO, 10.0 to 14.0% by weight $Na_2O$, 0.01 to 0.3% by weight $K_2O$, 0.0 to 0.2% by weight $Fe_2O_3$, 0.01 to 0.3% by weight $SO_3$, 0.03 to 0.3% by weight $P_2O_5$ and 0.03 to 0.3% by weight $V_2O_5$, with the sum of all named constituents yielding 100% by weight, wherein $P_2O_5$ and $V_2O_5$ are present in approximately equal amounts and wherein the glass is colorless and transparent.

18. Method for manufacturing ultraviolet-light absorbing glass exhibiting light protection properties from a batch of melted raw materials comprising the steps of adding a vanadium-containing aggregate to the batch of melted raw material, wherein a residual product in solid form containing approximately 50% vanadium pentoxide is used as the vanadium-containing aggregate.

\* \* \* \* \*